(12) United States Patent
Castle

(10) Patent No.: US 6,552,788 B1
(45) Date of Patent: Apr. 22, 2003

(54) HYPERSPECTRAL IMAGING USING LINEAR CHROMATIC ABERRATION

(75) Inventor: Kenneth R. Castle, Tucson, AR (US)

(73) Assignee: Ruda & Associates, Tucson, AZ (US)

(*) Notice: Subject to any disclaimer, the term of this patent is extended or adjusted under 35 U.S.C. 154(b) by 4 days.

(21) Appl. No.: 09/901,216

(22) Filed: Jul. 9, 2001

(51) Int. Cl.[7] .............................................. G01J 3/28
(52) U.S. Cl. ...................... 356/326; 356/328; 356/305
(58) Field of Search ................................ 356/326, 328, 356/305

(56) References Cited

U.S. PATENT DOCUMENTS

| | | | | |
|---|---|---|---|---|
| 5,177,556 A | * | 1/1993 | Rioux | 356/326 |
| 5,760,899 A | * | 6/1998 | Eismann | 250/226 |
| 6,031,610 A | | 2/2000 | Wilkens et al. | 356/419 |

* cited by examiner

Primary Examiner—Mark A. Robinson
Assistant Examiner—Lee Fineman
(74) Attorney, Agent, or Firm—Howard R Popper

(57) ABSTRACT

An image acquisition system employs a spectral imaging system whose focusing optics provide a linear dispersion of color along a tilted focal plane which intercepts each spectral component at the correct focal distance for that color.

4 Claims, 3 Drawing Sheets

HYPERSPECTRAL IMAGING USING LINEAR CHROMATIC ABERRATION

FIELD OF THE INVENTION

This invention relates to hyperspectral imaging and, more particularly, to correcting color images for keystoning and smile.

BACKGROUND OF THE PRIOR ART

Present day imaging optical systems form images by attempting to focus the wavelengths of light passing through the lens system into the smallest possible volume. Refractive imagers may be made with differing degrees of optical correction for both monochromatic (spherical, astigmatism, coma,) and polychromatic aberrations. Lens radial distortion, often called pin-cushion or barrel distortion, is another source of image distortion and induced vertical parallax. Lens radial distortion is caused by the use of spherical lens elements, resulting in the lens having different focal lengths at various radial distances from the center of the lens. Increasing focal length from the center of the lens is called pin-cushion distortion and the reverse is called barrel distortion. Parallax among the object plane, the lens plane and the image (film or CCD) plane affects image perspective and produces the keystone distortion effect sometimes experienced.

Conventional spectrometer lens design practice operates on the assumption that a slit is the object, a dispersive element is sandwiched between a collimating lens and an imaging lens, and an image is formed on a detector oriented perpendicular to the optical axis. The resultant image that is formed consists of multiple images of the slit that are spread out in the color direction. Each slit image corresponds to a different wavelength. Two aberrations or distortions are commonly found in these designs. One distortion may be termed "chromatic keystone"—an effect that causes a line of each color to differ in length depending on where the ray propagates with respect to the center of the lens. The second distortion caused by these designs is curvature of the slit, so that light of a single color does not form a straight line, but is instead curved up ("smile"), or down ("frown"). This distortion arises at the dispersing element when the ray bundles exit the dispersing element at compound angles relative to the flat surface. Often, the amount of curvature varies with wavelength. It would be of great advantage to provide an optical system in which both of these distortions are removed.

SUMMARY OF THE INVENTION

In accordance with the principles of the invention, an image acquisition system scans an object and passes it through an imaging spectrometer whose imaging optics are deliberately designed, advantageously using commercially available optical design software, to be chromatically dispersive rather than attempting to be apochromatic. The lens system of the imaging spectrometer accepts light from the object that has passed through a slit, collimates it and, instead of focusing all of the wavelengths in the transmitted light into the smallest possible size in a single focal plane, separately focuses each wavelength into a respective focal plane. The position of the focal plane for each wavelength is proportional (either linearly or non-linearly) to wavelength. For example, the middle wavelength may be focused at one position, the shortest wavelength focused at a second position, and the longest wavelength focused on the other side of the central wavelength. A new, color-corrected focal plane is defined by the collection of the focal planes respective to each color and a suitable device such as a CCD may then be positioned at the color-corrected focal plane to acquire an image that is free of color keystoning, smile or frown.

BRIEF DESCRIPTION OF THE DRAWING

The foregoing and other objects and features of the invention may become more apparent from a reading of the ensuing description together with the drawing, in which.

DETAILED DESCRIPTION

Figure 1:
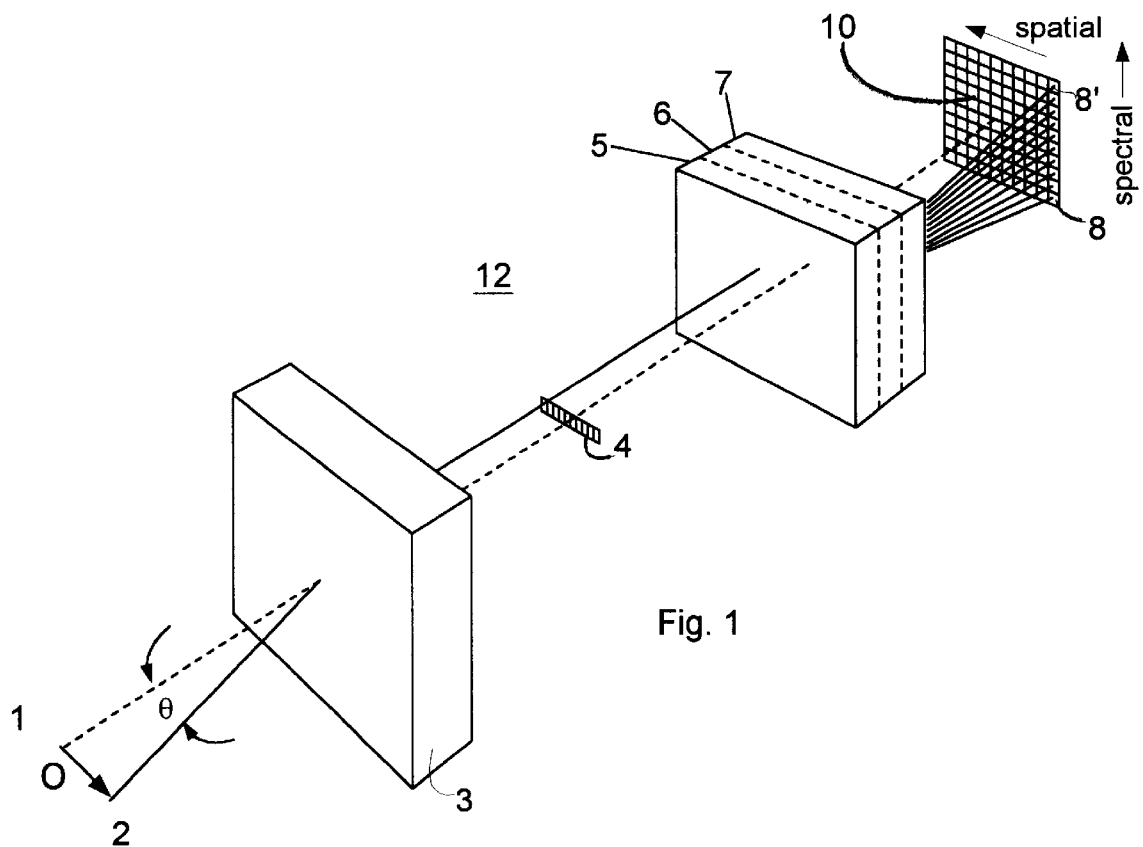
FIG. 1 schematically shows an image acquisition system.
Figure 3:
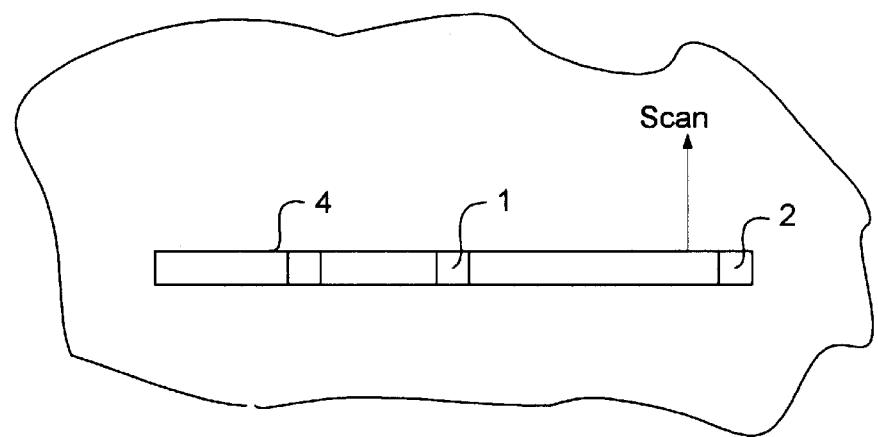
FIG. 3 illustrates pixels in the scanning slit of FIG. 1.

Referring to FIG. 1, the optical axis 1 of optical system 12 is the path of a ray from the "foot" of radiant object O which passes through the center of the optical system. Ray 2 is a chief ray which starts from the "head" of radiant object O and enters the optical system at an angle θ to ray 1. Both rays 1 and 2 enter foreoptic assembly 3 which forms an image of object O at the position of rectangular slit 4 whose long dimension is designed to be much greater than its short dimension. Ray 1 passes through the center of slit 4 and ray 2 passes through one edge of slit 4. Referring to FIG. 3, light from the principal ray 2 and the axial ray 1 is shown at slit 4.

The "slice" of object O obtained at any instant at slit 4 is determined either by "flying" optical system 12 over object O (as would be the usual situation in high altitude photography where object O was a point of interest on the ground and optical system 12 was located in an aircraft), or by equipping foreoptic assembly 3 with a scanning device such as a moving mirror. The slice at slit 4 therefore sequentially contains all of the spectral content of all of the light from the object.

Figure 4:
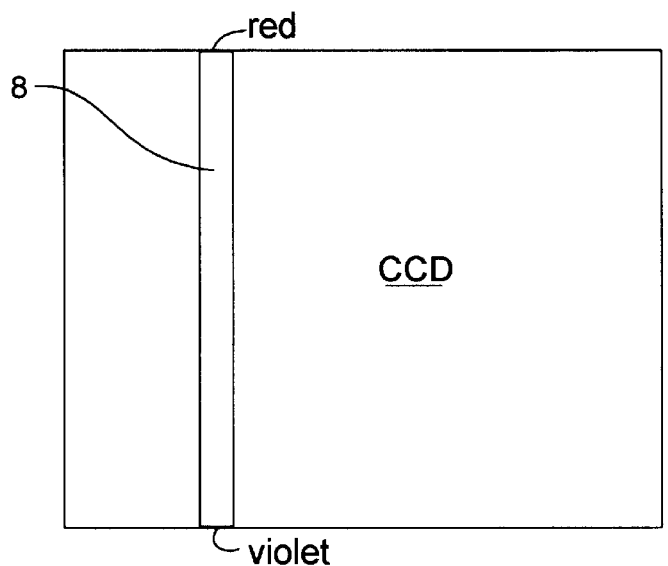
FIG. 4 illustrates color dispersion in a corrected system.

Referring back to FIG. 1, light from slit 4 is passed through imaging spectrometer 5, 6, 7 to CCD 10. Imaging spectrometer 5, 6, 7 includes collimating optics 5, dispersing optics 6 (such as a prism or a diffraction grating), and imaging optics 7 which forms an image of the color spectrum of the light from the pixel centered on ray 2 in slit 4 (refer back to FIG. 4) in column 8–8' on CCD 10. Thus, at the instant shown in FIG. 1, spectrometer 5, 6, 7 would ideally project the color spectrum of the light from slit 4 on to CCD 10 in a direction that is perpendicular to the long dimension of slit 4. Information from CCD 10 is transferred to computer memory (not shown). In similar fashion, light from successive slices of object O is acquired by foreoptic assembly 3 and passed through slit 4 and imaging spectrometer 5, 6, 7 until the entire spectrum of light from object O has been scanned onto CCD 10 and stored in a spatial "data cube" of color in computer memory. By achieving good spatial resolution along the slit, and maintaining it to the image plane, the system moves beyond a spectrometer and becomes a hyperspectral imager.

A problem arises because the image formed on CCD 10 by conventional optics 5 & 7 will likely suffer from both color keystoning and "smile". Thus, referring to FIG. 7a, an ordinary singlet lens configuration produces a variation of focus with wavelength that can be fairly described as having a substantially non-linear shape. In an achromatic lens, shown in FIG. 7b, the parabolic focus curve is such as to bring two wavelengths simultaneously in focus. Achromatic lenses are capable of bringing two colors to a single focus while apochromatic lenses bring three or more colors to a single focus. Conventional optics of FIGS. 7a and 7b attempt to focus an image onto a flat plane perpendicular to the system's optical axis and fail to some degree when certain colors wish to form an image in different axial locations.

Figure 8:
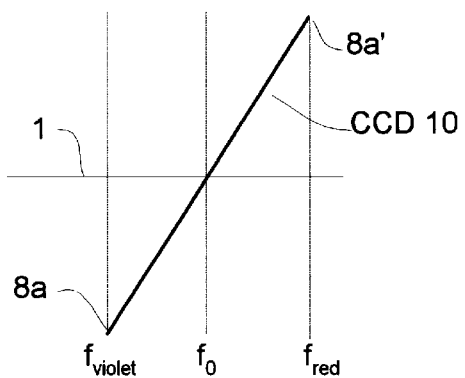
FIG. 8 shows the alignment of a CCD in the focal plane in accordance with the principles of the present invention.
Figure 5:
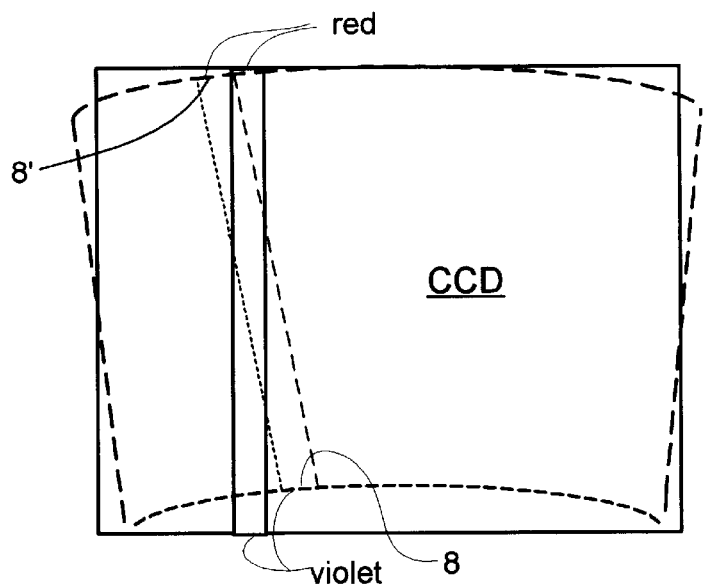
FIG. 5 shows the effects of smile and keystoning.
Figure 6:
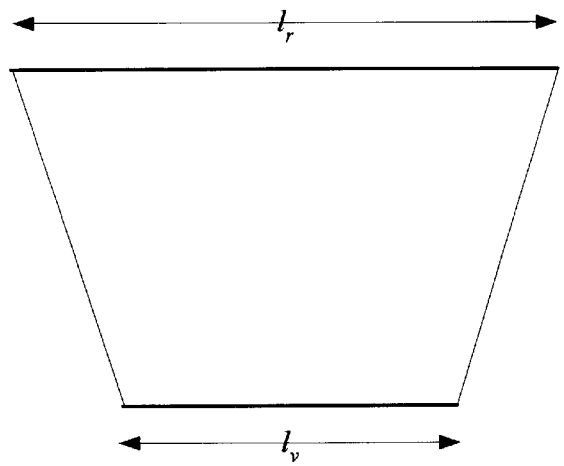
FIG. 6 shows the effect of color keystoning.

When color keystoning and smile are present, the color spectrum of slit 4 does not lie on CCD 10 in a direction truly perpendicular to slit 4. Instead, the color spectrum becomes spatially skewed, as shown in FIGS. 5 and 6, causing a loss of some of the color spectrum from points of the object at the ends of the slit. More particularly, as shown in FIG. 6, color keystoning causes the lengths of the red color line at the top of CCD 10 and of the violet color line at the bottom of the CCD to be different. Since θ, the angle between the principal ray 2 and the optical axis 1 shown in FIG. 1 has not changed, the length $l_{red}$ of the red line and the length lviolet of the violet line must be due to a change in the focal length for each color, as may be seen from the relationship:

$$l_{red} = 2F_{red} \tan \theta$$

$$l_{violet} = 2F_{violet} \tan \theta,$$

where $F_{red}$ is the focal length for the color red and $F_{violet}$ is the focal length for the color violet. Accordingly, a flat focal plane at right angles to the optical axis situated at a uniform distance $f_0$ will have red and violet information in focus, but at different spatial magnifications. It is desirable to make the spatial magnification constant with wavelength, implying that the focal length is constant with wavelength. This results in each color focusing at a different distance behind imaging lens 7 as shown in FIG. 8.

The smiling keystone which would be projected on CCD 10 by conventional optics is shown dotted in FIG. 5 is curved and causes loss of some of the color spectrum from points along the slit. Although the information in the data cube acquired from the imaging spectrometer thus far described could, at least theoretically, be processed one pixel at a time to cure the smile and color keystoning aberrations, such processing may take an inordinate amount of time and be unsuitable for some purposes requiring "real time" imaging. Thus, it is also desirable to have the smile corrected simultaneously with the color keystoning in order to minimize subsequent image processing.

Figure 2:
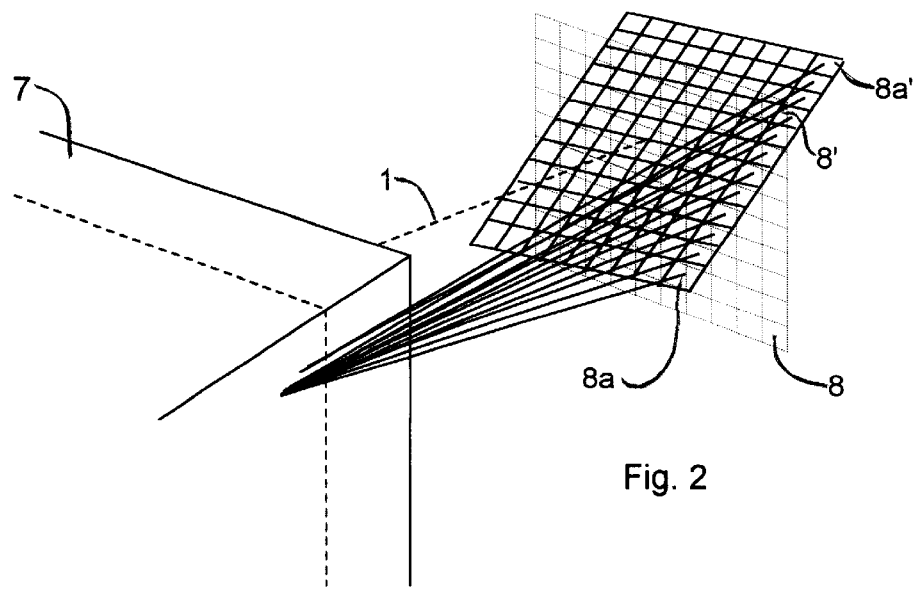
FIG. 2 schematically shows details of the image acquisition system in which the focal plane has been aligned in accordance with the principles of the present invention.
Figures 7A, 7B, 7C:
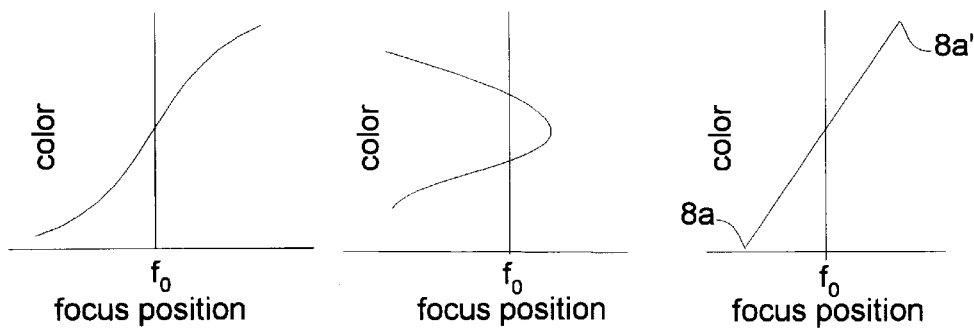
FIGS. 7a–7c respectively show focusing by a singlet lens, a doublet lens and of a lens system designed according to the criteria of the present invention.

In accordance with the principles of the present invention, imaging optics 7 of imaging spectrometer 5, 6, 7 is designed unlike conventional imaging optics which would focus all of the wavelengths into the smallest possible size in a single focal plane at right angles to the optic axis. Instead, imaging optics 7 separately focuses each constituent wavelength provided by slit 4 into a respective "plane" at the appropriate focal distance from optics 7. This necessitates that column 8–8' of CCD 10 be tilted with respect to optical axis 1 to the location of column 8a–8a', as shown in FIG. 2. Accordingly, the upper end of the new focal plane is at the focal distance from optics 7 that is appropriate to the focal length for red light while the lower end of the new focal plane is at the focal distance appropriate for violet light. In other words, as shown in FIG. 7c and FIG. 8, CCD 10 is tilted to intercept each of the color "planes" at its appropriate focal distance, $f_{violet}$ through $f_{red}$.

Accordingly for a flat focal plane, the process of the invention involves using a tilted image plane having a spatial vs. spectral "grating" design. Lateral color is ignored during optimization, and the image spots at each design wavelength and design field of view are minimized in spatial extent. The tilt angle of the focal plane is allowed to vary as the choice of glass types in the collimating and imaging arms of the spectrometer are varied to produce the linear axial chromatic aberration.

The color keystone effect (different focal lengths for different colors producing a wedge or keystone shape to the overall image) can be eliminated by allowing the optical distortion to vary as a function of color. This can be accomplished by targeting the maximum field of view chief rays, each a separate wavelength, to have the same image height. Ideally, the image energy centroids would be similarly targeted, but for most applications where coma is negligible, the chief ray is sufficient.

When employing commercially available lens design software, the lens designer is given the option to specify a collection of constraints called a "merit function" to guide the computer during the design and optimization process. These constraints typically include ray heights, lens separations, aberration control, etc. The merit function may be selected either by starting with one of several default merit functions, or by manually specifying each constraint. For example, the designer may choose to start with near-zero chromatic error to create a rough lens design since the monochromatic aberrations (i.e. spherical aberration, coma, astigmatism, distortion, etc.) will initially be greater than the chromatic aberrations (longitudinal and lateral color). The software will then propose a lens design that will approach the shape to create high quality images. Once the correct lens shapes have been designed, the type of glass can be varied to produce the desired chromatic variation. The amount of chromatic variation the designer will adopt will be enough to smooth the non-linear variations while minimizing the amount of focal plane tilt.

The invention takes advantage of the dispersive effects of glass in order to balance the effects and produce a lens design that focuses linearly with wavelength. That is, if there exist three wavelengths with the second wavelength midway between the other two, the focus position of the second wavelength will be midway between the other two focus positions, along the optical axis of the lens assembly. This attribute by itself would yield a lens design not well suited for imaging under normal usage. A special application known as a diffraction grating makes full use of the invention. The properties of the diffraction grating are to disperse light and to do so linearly in angle Combining the diffraction grating with the invention causes the linear angle variation to combine with the linear focus variation. By aligning a flat detector to be tilted with respect to the lens assembly optical axis, with the tilt axis parallel to the grating lines, the chromatic images are separated but remain in focus on the detector. The invention can be driven further and used with a non-grating dispersing element such as a prism. Here, the angle variation is non-linear. By making the lens assembly focus variation non-linear also, in a complimentary sense, the tilted detector can still be used for image formation with non-linear chromatic separation.

While the foregoing has described an implementation of the invention using existing, commercially available optical design software to produce a linear variation in focal length with color so that multiple configurations of the lens define a new focus position for each constituent wavelength which varies linearly with wavelength, it should be apparent that a non-linear variation in focus may also be attempted which would result in the image plane of the CCD be other than flat. Further and other variations will be apparent to those skilled in the art without, however, departing from the spirit and scope of the invention.

What is claimed is:

1. An image acquisition system having an imaging spectrometer exhibiting axial chromatic aberration causing each color to focus at a different focal distance the improvement comprising:

an arrangement for compensating for said chromatic aberration by linearly dispersing each said aberrant color so that the chief rays for each said color produce the same image height; and a focal surface shaped to intercept each such dispersed color at a respective focal distance.

2. An image acquisition system according to claim 1 wherein said arrangement disperses each said color so that the image energy centroids of each principal ray of each color produce the same image height.

3. An image acquisition system according to claim 2 wherein said focal surface is planar and is oriented at an angle to the optical axis to of said colors so as to intercept at one edge one of said dispersed colors and, at an opposite edge, another of said dispersed colors.

4. An image acquisition system according to claim 2 wherein said imaging spectrometer includes a slit for sequentially obtaining slices of an object being scanned.

* * * * *